United States Patent [19]
Tsegelsky

[11] Patent Number: 6,086,721
[45] Date of Patent: Jul. 11, 2000

[54] FACILITY FOR DISTILLING A LIQUID PRODUCT

[76] Inventor: Valery Grigorievich Tsegelsky, ulitsa Zelenodolskaya, 11, kv. 93, Moscow, Russian Federation

[21] Appl. No.: 09/091,286

[22] PCT Filed: Oct. 11, 1996

[86] PCT No.: PCT/RU96/00303

§ 371 Date: Jun. 16, 1998

§ 102(e) Date: Jun. 16, 1998

[87] PCT Pub. No.: WO97/23262

PCT Pub. Date: Jul. 3, 1997

[30] Foreign Application Priority Data

Dec. 22, 1995 [RU] Russian Federation ............. 95121523

[51] Int. Cl.⁷ ................................ B01D 3/10; B01D 5/00
[52] U.S. Cl. ................. 196/114; 196/100; 196/103; 196/136; 196/138; 202/197; 202/205; 203/91; 203/DIG. 14; 208/357; 208/366
[58] Field of Search ..................... 202/205, 197, 202/202, 182; 203/91, 40, DIG. 14; 208/347, 357, 366; 159/DIG. 16, DIG. 40; 196/98, 100, 114, 135, 138, 103, 140, 133, 155, 136, 137

[56] References Cited

U.S. PATENT DOCUMENTS

| | | | |
|---|---|---|---|
| 1,567,429 | 12/1925 | Earl et al. | 208/361 |
| 2,105,935 | 1/1938 | Swanson . | |
| 3,505,176 | 4/1970 | Buchsbaum et al. | 203/73 |
| 3,579,307 | 5/1971 | Wakita et al. . | |
| 4,292,140 | 9/1981 | Kawasaki et al. | 203/DIG. 14 |
| 4,695,349 | 9/1987 | Becker et al. | 203/DIG. 14 |
| 5,209,828 | 5/1993 | Chou et al. | 202/205 |
| 5,935,388 | 8/1999 | Meszaros | 203/DIG. 14 |

FOREIGN PATENT DOCUMENTS

| | | |
|---|---|---|
| 0 634 198 A1 | 1/1995 | European Pat. Off. . |
| 3805157 | 4/1989 | Germany . |
| 1273379A1 | 11/1986 | U.S.S.R. . |
| 9835736 | 8/1998 | WIPO . |

OTHER PUBLICATIONS

Lastovkin G.A., *Petroleum Processing Operator Handbook* pp. 73–75 (L., Khimiya Publishers 1986).

Primary Examiner—Virginia Manoharan
Attorney, Agent, or Firm—Nath & Associates PLLC; Gary M. Nath

[57] ABSTRACT

A vacuum-creating apparatus of the unit is provided with a pump and a separator, wherein the pump is connected at its inlet to the separator, a jet device is made as a liquid-gas device and is connected at its outlet, by means of a pressure main, to the separator and at its liquid input to an output of the pump, wherein the longitudinal axis of the jet device is positioned vertically, the permissible deviation from the vertical axis being ±15°, an outlet cross section of a liquid supply nozzle of the jet device is positioned at a height of from 5 m to 35 m above an inlet to the separator and an outlet section of the pressure main is positioned below the level of the liquid in the separator to form a hydraulic seal.

4 Claims, 2 Drawing Sheets

FACILITY FOR DISTILLING A LIQUID PRODUCT

BACKGROUND OF THE INVENTION

The present invention relates to units for distillation of a liquid product, primarily petroleum stock, and may be used in the petroleum refining industry for rectification of petroleum stock.

A unit for distillation of petroleum stock is known comprising a vacuum column and a vacuum-creating apparatus with a jet device—steam ejector (see, e.g. U.S. Pat. No. 2,105,935, class C 10 G 7/00, 1938).

A drawback of the known unit is that petroleum fractions are mixed with steam and, accordingly, a portion of the petroleum fractions are carried away with the steam, which results in contamination of the steam condensate and reduction of the efficiency of the unit.

The unit most similar to the proposed invention is a unit for distillation of a liquid product comprising a vacuum column with mains for supplying the liquid product and removing the vapor-gas phase and a vacuum creating apparatus including a jet device—a steam ejector, connected by its gas input to the vapor-gas phase removal main of the vacuum column (see, for example, the Handbook of a Petroleum Refiner, edited by G. A. Lastovkin, Leningrad, Khimiya, 1989, p. 74).

The necessary degree of the vacuum in the unit indicated above is achieved by an ejector-type steam pump in which steam is used as the ejecting (working) medium.

The steam mixes with petroleum vapors and decomposition gases which results in contamination of the steam condensate, and also results in a part of the petroleum fractions being carried away with the steam condensate. Furthermore, the ejector-type steam pump does not ensure compression of the hydrocarbon gases to the pressure required for supplying the gases, for example, into the fuel collector of a refinery. Therefore, such gases have to be burned in flares if an additional compressor is not provided. It should also be noted that the mutual positioning of elements of the unit relative to each other has a substantial effect on the operation of the unit. In particular, the position of the jet device and the pressure main in space and the height at which the jet device is positioned relative to other elements of the structure are important, since if the positioning of the aforesaid elements of the unit relative to each other is not optimum, this may result in a loss of the vacuum while the vacuum-creating apparatus is stopped, which will reduce the reliability of operation of the unit as a whole and make its utilization more difficult.

Another drawback of the known unit is the condensation of highly volatile fractions prior to the jet device in a cooler-condenser, which due to the pressure differential in the latter results in a higher pressure in the upper part of the vacuum column, and this reduces the degree of yield of highly volatile fractions or results in an increase of the power consumed for the creation of a vacuum in the vacuum column.

BRIEF SUMMARY OF THE INVENTION

The object of the present invention is to intensify the process of distillation of a liquid product, to reduce power consumption and at the same time enhance reliability of operation of the unit, enhance the ecological situation and simplify operation of the vacuum-creating apparatus of the unit for vacuum distillation of a liquid product.

This object is achieved in a unit for distillation of a liquid product comprising a vacuum column with mains for supplying the liquid product and removing the vapor-gas phase and a vacuum-creating device including a jet device connected by its gas inlet to the vapor-gas phase removal main of the vacuum column, in that the vacuum-creating device is additionally provided with a pump and a separator, wherein an inlet of the pump is connected to the separator, the jet device is made as a liquid-gas device and is connected at its outlet by means of a vertical pressure main to the separator and at its liquid inlet to the pump outlet, wherein the jet device is positioned in a vertical position, with permissible deviation from the vertical by $\pm 15°$, the outlet cross section of a liquid supply nozzle of the jet device is positioned above the separator at a height of from 5 m to 35 m, and the outlet section of the pressure main is positioned below the level of the liquid in the separator to form a hydraulic seal. In a preferable embodiment of the unit, the pressure main is made straight, positioned coaxially with the jet device and their longitudinal axis is positioned vertically, with a permissible deviation of $\pm 15°$ from the vertical.

The jet device may be made as a multistage device with the height at which the output cross section of the liquid supply nozzle of the first stage is positioned above the separator being from 5 m to 35 m.

Furthermore, the subsequent liquid supply nozzles of the jet device which follow the first stage may be positioned along the pressure main, wherein the latter may be made with bends along that main.

The proposed unit makes it possible to maintain the depth of the vacuum in the vacuum column, which is required according to the technology, by pumping the vapor-gas phase from the column with subsequent condensation of a portion of the hydrocarbons (in the case of petroleum refining) in the flow passage of the jet device and the following main. The gases which are not condensed are compressed in the unit to a pressure at which they may be used for the technological needs of a user. As distinctive from the prototype, the active working medium of the jet device is a liquid medium which circulates along a closed circuit. This prevents contamination of the environment, since there is no release of the vapor-gas phase condensate into the environment as occurs in the prototype.

The execution of the unit as described above avoids the installation of a cooler-condenser in the main for removal of the vapor-gas phase by organizing the condensation process in the jet device, and this, in turn, makes it possible to reduce the hydraulic resistance in the main for removal of the vapor-gas phase. This makes it possible with the same power consumption during the process of distillation of the liquid product as in the prototype to increase the vacuum in the upper and, accordingly, lower parts of the column, which results in an increase in the yield of the distillation products in the process of operation of the vacuum column.

The mutual positioning of elements of the unit relative to one another is important, in particular, the spatial position of the jet device and the pressure main and the height at which the jet device is positioned above the separator, in particular the distance from the liquid supply nozzle exit section to the separator.

This is related to a number of factors which have an effect on the operation of the unit as a whole and on its reliability in operation, especially in emergency situations, for example, when there is a sudden stop in the operation of the jet device, independent of the reason for the stop.

In the first place, it should be noted that the process of interaction between the working liquid flowing out of the nozzle and the compressed gas continues further in the straight section of the pipe forming the pressure main after the mixing chamber of the liquid-gas jet device. The liquid moving along the straight section of the pipe under the action of gravitational forces and pressure differential interacts with the gas and further compresses it from the pressure at the outlet from the jet device to the pressure in the separator. At the same time, further condensation of the vaporous constituents of the gas component, which were not able to condense in the time allowed in the mixing chamber of the jet device, to liquid takes place. Therefore, the straight section of the pipe after the jet device is an inseparable part of the liquid-gas jet device and enables the efficiency of its use in the proposed vacuum-creating apparatus of the unit to be enhanced. Reduction of the height at which the liquid supply nozzle of the jet device is positioned or, where the jet device is made multistage, the height at which the outlet cross section of the liquid supply nozzle of the first stage is positioned above the inlet to the separator, especially below 5 m, reduces the positive effect of the action of gravitational forces on the operation of the liquid-gas jet device and on the flow of the medium mixture in the straight section of the pressure main. Deviation of the longitudinal axis of the jet device and the pressure main from the vertical by more than ±15° and bends in the pipe forming the pressure main affect the positive effect gained from the action of gravitational forces on the operation of the liquid-gas jet device and on the character of the flow of the medium mixture in the pressure main.

On the other hand, an increase in the height at which the flow exit of the liquid supply nozzle of the jet device is positioned or the height at which the flow exit of the liquid supply nozzle of the first stage of a multistage jet device is positioned above the inlet to the separator to more than 35 m results in an increase of the friction loss due to interaction between the moving two-phase flow of variable density and the solid wall.

Thus, it becomes clear that the height at which the outlet cross section of the liquid supply nozzle is positioned or the height at which the outlet cross section of the liquid supply nozzle of the first stage (in the case of making the jet device as a multistage device) is positioned, should be within a clearly defined range of heights above the separator.

As noted above the jet device may be made as a multistage device. This is related to the fact that in such an embodiment there is a certain increase in the positive effect during operation of the vacuum-creating apparatus. The nozzles of the second and subsequent stages, which nozzles can be mounted on the pressure main, by supplying the liquid working medium along the walls of the pipe forming the pressure main have an active effect on the boundary layer, which promotes reduction of the hydraulic resistance when a flow of the medium mixture formed in the mixing chamber of the jet device flows along the pressure main. Furthermore, an additional surge of the liquid working medium makes it possible to increase the degree of compression of the steam-gas mixture being pumped out. As experiments which were carried out showed, it is most advisable to direct not more than 30% of the flow rate of the liquid medium supplied through the liquid supply nozzle of the first stage to the nozzles of the second and subsequent stages.

In this manner an increase in the degree of the vacuum in the vacuum column is achieved with less power consumed in the creation of the vacuum, and this enhances the efficiency of operation of the unit.

Another serious aspect of the operation of the unit to which attention was directed is to increase the reliability of operation of the unit when there is a stop in the operation of the vacuum-creating apparatus.

Taking into account that excess pressure is produced in the separator by the jet device, and the vacuum is maintained in the column, a stop in the operation of the jet device may result in a blow-out of liquid from the separator along the pressure main and the vapor-gas phase removal main into the vacuum column with subsequent loss of the vacuum in the latter, which results in a disruption of operation of the whole unit for distillation of a liquid product. Taking the possible ranges of pressure created by the jet device in the separator and in the vacuum column into account, it has been established that the outlet cross section of the liquid supply nozzle of the jet device, and in another embodiment—the outlet cross section of the nozzle of the first stage of a multistage jet device, should be positioned at a height at least 5 m above the inlet into the separator, wherein the upper range of positioning the outlet cross section of the aforesaid liquid supply nozzles may be limited, as noted above, to a height of 35 m. Furthermore, a hydraulic seal should be provided at the outlet of the pressure main.

Finding a solution to this problem is difficult, since the height at which the liquid supply nozzle of the jet device is positioned above the inlet into the separator cannot be determined using ordinary mathematical calculations, i.e. by the traditional calculation of the height of a hydrostatic column of liquid. This is related to the fact that a liquid-gas mixture which is saturated with light hydrocarbons (in the cases of petroleum refining) enters the pressure main from the jet device, wherein, during movement of the mixture along the pressure main the process of condensation of light hydrocarbon vapors continues, which results in a change in the density of the mixture moving along the pressure main. Thus, a medium mixture with a constantly changing composition flows in the pressure main along the whole height thereof, wherein the changes in the composition to a substantial degree depend on a number of factors, for example, such as the composition of the liquid product which is supplied into the vacuum column, the degree of saturation of the liquid working medium circulating in the vacuum-creating apparatus with gases, temperature factors related to seasons of the year or to modes of operation of the unit and a number of other factors which have an effect on the mode of flow of the mediums in the jet device and in the pressure main following it.

The most critical period of operation is the moment when there is a stop of operation, when, in view of the fact that a pressure close to the pressure in the vacuum column is created above the column of liquid in the flow part of the jet device and the pressure main, the process of degasification of the condensed light hydrocarbons (in the case of petroleum refining) begins, which results in the formation of a liquid-gas column, the height of which increases. Apparently, it is possible to some extent to give consideration to the creation of an air lift in this period which increases the possibility of a blow-out of liquid from the separator and a loss of the vacuum in the vacuum column. Furthermore, an analysis of literary sources known in the art does not make it possible to determine the degree to which the action of gravitational forces affects the operation of a vertically positioned vacuum liquid-gas jet device of great length.

Thus, summing up the foregoing, it is advisable to position the outlet cross section of the liquid supply nozzle of the jet device or, in another embodiment—the outlet cross section of the liquid supply nozzle of the first stage of a multistage jet device above the inlet into the separator at a distance of from 5 in to 35 m, wherein the greatest positive effect on the operation of the unit will be achieved by vertical arrangement of the jet device and the following pressure main, deviation from the vertical being permissible by a value of not more than ±15°.

Furthermore, modes of operation of the unit are possible when additional intensification of the process of mixing the liquid and vapor-gas phases is required in order to accelerate the process of condensing the vapor phase (in the case where its amount is relatively greater with respect to the gas phase). In that case it is advisable to make the pressure main with bends along it, thus increasing the low hydraulic resistance.

As a result, enhancement of the efficiency, ecological parameters and reliability of operation of the unit for distillation of a liquid product is achieved simultaneously with simplification of its operation, since the necessity of performing a strictly defined sequence of steps is no longer necessary during the period when there is a stop of the vacuum-creating apparatus, this being especially important when an emergency situation occurs.

DETAILED DESCRIPTION OF THE INVENTION

Figure 1:
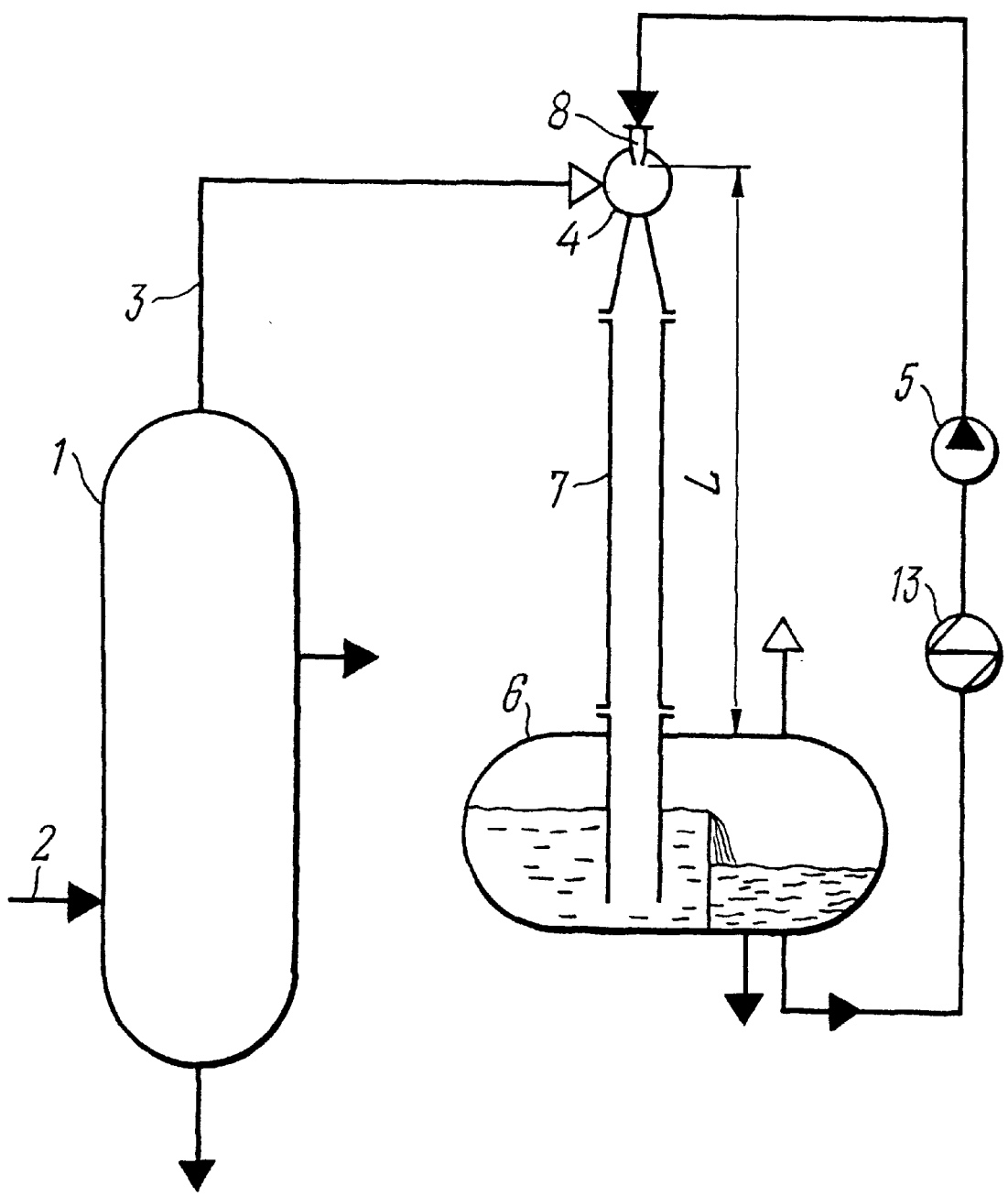
FIG. 1 shows a diagram of a unit for distillation of a liquid product with a single-stage jet device.

The unit for distillation of a liquid product according to FIG. 1 comprises a vacuum column 1 with a main 2 for supplying the liquid product and a main 3 for removing the vapor-gas phase and a vacuum-creating device including a jet device 4 connected by a gas inlet to the vapor-gas phase removal main 3 of the vacuum column 1. The vacuum-creating device is additionally provided with a pump 5 and a separator 6, wherein the pump 5 is connected by its inlet to the separator 6, the jet device 4 is made as a liquid-gas device and is connected at its outlet by means of a pressure main 7 to the separator 6 and at its liquid inlet to the pump 5 outlet, wherein the jet device 4 is positioned in a vertical position, with permissible deviation of its longitudinal axis from the vertical being ±15°, the height L at which the outlet cross-section of a liquid supply nozzle 8 of the jet device 4 is positioned above the inlet into the separator 6 is from 5 m to 35 m, and the outlet section of the pressure main 7 is positioned below the liquid level in the separator 6 to form a hydraulic seal. The pressure main 7 in a preferable embodiment is made straight, positioned coaxially with the jet device 4 and their common longitudinal axis is positioned vertically, with a permissible deviation of ±15° from the vertical.

Figure 2:
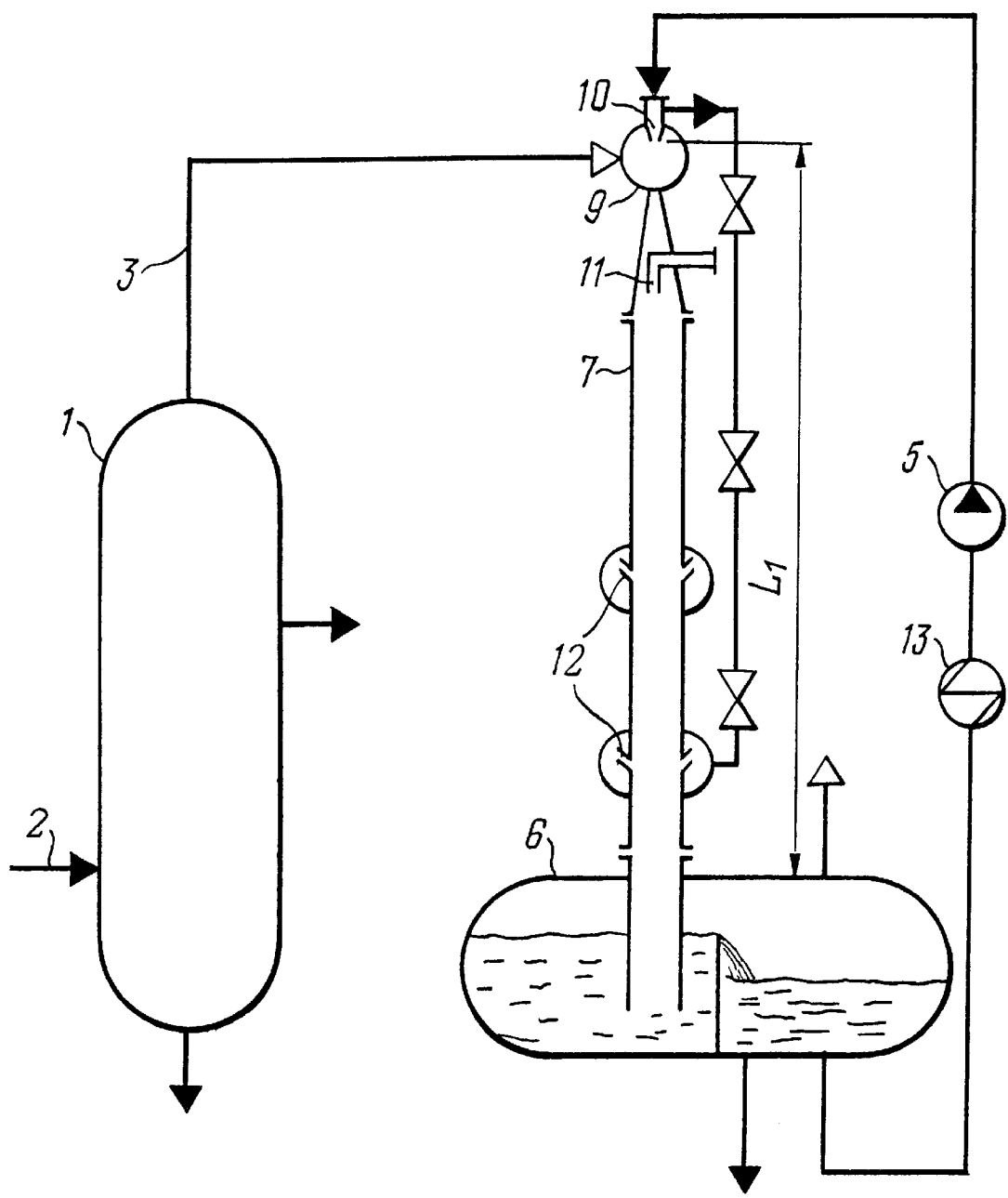
FIG. 2 shows an embodiment of the unit for distillation of a liquid product with a multistage jet device.

The unit for distillation of a liquid product according to FIG. 2 differs from the unit according to FIG. 1 in that instead of the single-stage jet device 4 with the liquid supply nozzle 8, a multistage jet device 9 with a liquid supply nozzle 10 of the first stage and liquid supply nozzles 11, 12 respectively of the second and subsequent stages is provided, wherein the height $L_1$ at which the outlet cross section of the liquid supply nozzle 10 of the first stage is positioned above the inlet into the separator 6 is from 5 m to 35 m.

Independent of the embodiment of the unit, the circuit for circulation of the liquid working medium of the vacuum-creating apparatus of the unit is provided with a cooler 13.

The unit for distillation of a liquid product operates in the following manner.

The heated liquid product (in the case of petroleum distillation—petroleum stock) is fed along the liquid product supply main 2 into the vacuum column 1 which is under a pressure of 10–60 mm of mercury. The vapor-gas phase is pumped from the upper part of the column 1 along the main 3 by the liquid-gas jet device 4 (according to FIG. 1) due to the energy of the liquid working medium which is circulating through the closed circuit by means of the pump 5. The withdrawal of excess heat from the liquid working medium is carried out by the cooler 13 of the vacuum-creating apparatus, the excess heat having been produced partially due to dissipation of mechanical energy in its circulation circuit and partially due to the condensation of steam and the cooling of the noncondensed gas sucked out of the column 1 by the liquid-gas jet device 4, this ensuring temperature stabilization.

At the outlet from the liquid-gas jet device 4, as a result of energy transmission from the liquid working medium to the passive vapor-gas phase, a two-phase mixture is formed having a pressure greater than the pressure in the column 1, the two-phase mixture passing along the pressure main 7 into the separator 6. Final condensation of the vapor phase and light hydrocarbons, which were not condensed in the flow section of the jet device 4 due to a lack of time, takes place in the two-phase mixture in the pressure main 7, and the gas phase is additionally compressed. In the separator 6 under a pressure of more than 0.11 MPa, the two-phase mixture is separated into a gas phase and a liquid working medium. The compressed gas phase is removed from the separator 6 by a user for technological needs, and the liquid working medium is fed from the separator 6 to the inlet of the pump 5, which feeds it again into the liquid supply nozzle 8 of the liquid-gas jet device 4.

The operation of the unit for distillation of a liquid product according to FIG. 2 differs from the operation of the unit according to FIG. 1 described above only in that the liquid working medium is supplied by the pump 5 into both the liquid supply nozzle 10 of the first stage and the liquid supply nozzles 11, 12 of the second and subsequent stages. Wherein, the liquid supply nozzle 10 of the first stage, like nozzle 8 of the jet device 4, ensures the pumping out of the vapor-gas phase from the vacuum column 1, and the liquid supply nozzles 11, 12 of the second and subsequent stages intensify the process of compression of the gas phase and condensation of the vapor phase and the easily condensed components of the gas phase. In the case where there is no necessity for the operation of nozzles 11, 12 of the second and subsequent stages, the supply of the liquid working medium into them is terminated, and in that case operation of the unit according to FIG. 2 is completely identical to the operation of the unit according to FIG. 1 as described above.

If there is a stop in the operation of the vacuum-creating apparatus, then, due to the hydraulic seal at the outlet of the pressure main 7 and correctly selected, according to experimental results, height at which the outlet cross section of the liquid supply nozzles 8, 10 is positioned above the inlet into the separator 6, both the reverse flow of gases and the discharge of liquid from the separator 6 into the vacuum column 1 are prevented, and consequently, a loss of the vacuum in the column 1 is avoided. This makes it possible to stop the operation of the unit without disturbance of the technological modes in separate elements of the unit, in particular, in the vacuum column 1 and separator 6, and after that it is easy enough to rapidly actuate the unit for operation in the necessary mode.

Thus, the present invention solves actual problems in the petroleum refining and a number of other fields of industry and, in particular, an ecologically pure technology of vacuum distillation of liquid products is realized with a sufficiently high reliability of operation of the unit for distillation of a liquid product, which makes it possible to reduce financial expenditures on producing and maintaining the vacuum in the vacuum column and to increase the yield of light fractions of vacuum distillation of petroleum products.

The present invention, in addition to petroleum refining can be used in the chemical, food, pharmaceutical and other fields of industry.

What is claimed is:

1. A unit for distillation of a liquid product, said unit comprising:

a vacuum column for distillation of the liquid product;

means for feeding the liquid product to the vacuum column;

means for removing a vapor-gas phase from the vacuum column;

a vacuum-creating device including a jet device connected by its gas inlet to means for removing the vapor-gas phase, wherein the jet device is made as a liquid-gas jet device and intended for pumping the vapor-gas phase due to the energy of the liquid supplied therein, the vacuum-creating device is also provided with a pump for feeding the liquid, a separator for separation of the gas from the liquid, the pump being connected by its inlet with the separator and by its outlet with the liquid inlet of the liquid-gas jet device, the outlet of the liquid-gas jet device being connected by means of a pressure main with the separator, the longitudinal axis of the liquid-gas jet device being positioned with deviation from the vertical of plus or minus 15°, an outlet cross section of a liquid supply nozzle of the liquid-gas jet device is positioned above the inlet of the separator at a height from 5 m to 35 m, and an outlet section of the pressure main is positioned below the liquid level in the separator to form a hydraulic seal.

2. A unit according to claim 1, wherein the pressure main is made straight, is positioned coaxially with the liquid-gas jet device and their common longitudinal axis, is positioned with deviation from the vertical of plus or minus 15°.

3. A unit for distillation of a liquid product, said unit comprising:

a vacuum column for distillation of the liquid product;

means for feeding the liquid product to the vacuum column;

means for removing a vapor-gas phase from the vacuum column;

a vacuum-creating device including a jet device connected by its gas inlet to means for removing a vapor-gas phase, wherein the jet device is made as the liquid-gas multi-stage jet device and intended for pumping the vapor-gas phase due to the energy of the liquid supplied therein, the vacuum-creating device is also provided with a pump for feeding the liquid, a separator for separation of the gas from the liquid, the pump being connected by its inlet with the separator and by its outlet with the liquid inlet of the liquid-gas jet device, the outlet of the liquid-gas jet device being connected by means of a pressure main with the separator, the longitudinal axis of the liquid-gas jet device being positioned with deviation from the vertical of plus or minus 15°, an outlet cross section of a liquid supply first stage nozzle of the liquid-gas jet device is positioned above the inlet of the separator at a height from 5 m to 35 m, and an outlet section of the pressure main is positioned below the liquid level in the separator to form a hydraulic seal.

4. A unit according to claim 3, wherein the liquid supply nozzles of the second and subsequent stages of the liquid-gas jet device are positioned on the pressure main.

* * * * *

UNITED STATES PATENT AND TRADEMARK OFFICE
CERTIFICATE OF CORRECTION

PATENT NO. : 6,086,721
DATED : July 11, 2000
INVENTOR(S) : Tsegelsky

It is certified that error appears in the above-identified patent and that said Letters Patent is hereby corrected as shown below:

Claim 1,
Lines 21-22, change "of plus or minus 15°" to -- in the range from plus 15° to minus 15° --

Claim 2,
Line 4, change "of plus or minus 15°" to -- in the range from plus 15° to minus 15° --

Claim 3,
Line 10, change "the" to -- a --
Line 22, change "of plus or minus 15° to -- in the range from plus 15° to minus 15° --

Signed and Sealed this

Eighteenth Day of September, 2001

Attest:

NICHOLAS P. GODICI
*Attesting Officer*   *Acting Director of the United States Patent and Trademark Office*